United States Patent
Goss

(10) Patent No.: US 7,529,418 B2
(45) Date of Patent: May 5, 2009

(54) GEOMETRY AND VIEW ASSISTED TRANSMISSION OF GRAPHICS IMAGE STREAMS

(75) Inventor: Michael E. Goss, Millbrae, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 854 days.

(21) Appl. No.: 10/850,887

(22) Filed: May 20, 2004

(65) Prior Publication Data

US 2005/0259881 A1 Nov. 24, 2005

(51) Int. Cl.
*G06K 9/46* (2006.01)
(52) U.S. Cl. ...................................... 382/236; 345/419
(58) Field of Classification Search ................... 382/236
See application file for complete search history.

(56) References Cited

U.S. PATENT DOCUMENTS

| | | | | |
|---|---|---|---|---|
| 5,255,352 A * | 10/1993 | Falk | ........................... | 345/582 |
| 5,448,687 A * | 9/1995 | Hoogerhyde et al. | ........ | 345/423 |
| 5,654,771 A * | 8/1997 | Tekalp et al. | ................ | 348/699 |
| 5,751,931 A * | 5/1998 | Cox et al. | ................... | 345/440 |
| 5,793,371 A * | 8/1998 | Deering | ...................... | 345/418 |
| 5,818,463 A * | 10/1998 | Tao et al. | ..................... | 345/473 |
| 5,842,004 A * | 11/1998 | Deering et al. | .............. | 345/501 |
| 5,867,167 A * | 2/1999 | Deering | ...................... | 345/419 |
| 5,870,094 A * | 2/1999 | Deering | ...................... | 345/419 |
| 5,903,682 A * | 5/1999 | Chun | .......................... | 382/276 |
| 5,929,860 A * | 7/1999 | Hoppe | ........................ | 345/419 |
| 5,936,671 A * | 8/1999 | Van Beek et al. | ...... | 375/240.14 |
| 5,963,209 A * | 10/1999 | Hoppe | ........................ | 345/419 |
| 6,046,744 A * | 4/2000 | Hoppe | ........................ | 345/419 |
| 6,047,088 A * | 4/2000 | van Beek et al. | ............ | 382/243 |
| 6,072,496 A * | 6/2000 | Guenter et al. | .............. | 345/419 |
| 6,144,773 A * | 11/2000 | Kolarov et al. | .............. | 382/240 |
| 6,151,033 A * | 11/2000 | Mihara et al. | ............... | 345/475 |
| 6,167,159 A * | 12/2000 | Touma et al. | ............... | 382/242 |
| 6,184,897 B1 * | 2/2001 | Gueziec et al. | ............. | 345/440 |
| 6,222,551 B1 * | 4/2001 | Schneider et al. | ........... | 345/419 |
| 6,438,266 B1 * | 8/2002 | Bajaj et al. | .................. | 382/243 |
| 6,546,141 B1 * | 4/2003 | Jung et al. | ................... | 382/238 |

(Continued)

FOREIGN PATENT DOCUMENTS

WO WO 99/64944 * 12/1999

*Primary Examiner*—Matthew C. Bella
*Assistant Examiner*—Sath V. Perungavoor

(57) ABSTRACT

Geometry and view data relating to a image sequences is transmitted from a server to a client computer. Such enables reconstruction of images by a client with reduced bandwidth for the image stream transmission. A previous-image mesh of coordinates and depth values for selected pixels from the array of pixels in a previous-image is generated at the server. The depth values are transmitted to the client. A change-in-view matrix is generated at the server and transmitted to the client. Such represents the change in viewing parameters between the previous-image and a current-image. The change-in-view matrix is applied to the previous-image mesh to create a current-image mesh, independently at both the server and at the client. Such is applied to the previous-image to generate a predicted current-image. The current-image is generated at the server and a difference between the current-image and the predicted current-image is computed. The computed difference is transmitted to the client and applied to the predicted current-image generated at the client to generate the current-image.

11 Claims, 4 Drawing Sheets

U.S. PATENT DOCUMENTS

| | | | |
|---|---|---|---|
| 6,563,500 B1 * | 5/2003 | Kim et al. | 345/423 |
| 6,573,890 B1 * | 6/2003 | Lengyel | 345/419 |
| 6,606,095 B1 * | 8/2003 | Lengyel et al. | 345/473 |
| 6,614,428 B1 * | 9/2003 | Lengyel | 345/420 |
| 6,661,420 B2 * | 12/2003 | Arai et al. | 345/474 |
| 6,757,433 B1 * | 6/2004 | Lee | 382/236 |
| 6,868,645 B2 * | 3/2005 | Hauser | 52/742.14 |
| 6,959,114 B2 * | 10/2005 | Kim et al. | 382/232 |
| 6,985,526 B2 * | 1/2006 | Bottreau et al. | 375/240.1 |
| 6,995,761 B1 * | 2/2006 | Schroeder et al. | 345/419 |
| 7,348,976 B2 * | 3/2008 | Mori | 345/423 |
| 7,457,472 B2 * | 11/2008 | Pace et al. | 382/236 |
| 2002/0063707 A1 * | 5/2002 | Kawanaka | 345/423 |
| 2003/0169253 A1 * | 9/2003 | Kim | 345/419 |
| 2004/0017368 A1 * | 1/2004 | Isenburg | 345/419 |
| 2004/0021662 A1 * | 2/2004 | Taubin | 345/419 |
| 2004/0085315 A1 * | 5/2004 | Duan et al. | 345/428 |
| 2004/0217956 A1 * | 11/2004 | Besl et al. | 345/419 |
| 2005/0259881 A1 * | 11/2005 | Goss | 382/243 |
| 2006/0181536 A1 * | 8/2006 | Ostermann et al. | 345/473 |
| 2007/0206007 A1 * | 9/2007 | Taubin | 345/423 |

* cited by examiner

GEOMETRY AND VIEW ASSISTED TRANSMISSION OF GRAPHICS IMAGE STREAMS

FIELD OF THE PRESENT INVENTION

The present invention relates to improvements in data compression when transmitting image sequences of a three dimensional scene over a computer network from a server computer that renders the images to a client computer that displays the images. The present invention relates more specifically to the use of scene geometry to improve the compression of the image sequence.

BACKGROUND OF THE PRESENT INVENTION

The conventional method for displaying a moving picture is to display a sequence of still images in rapid succession. In a typical high quality computer animation, 30 or more still images are displayed each second. For a moving picture of this type at a typical screen resolution (1280 by 1024 pixels) to be transmitted uncompressed across a computer network, a data transfer bandwidth of around 944 Mb/s is required. Such is over 9 times the total bandwidth available on a typical 100 Mb/s local area network. Very substantial data compression is therefore required.

There are several conventional image stream compression techniques. One reduces the size of the individual images. Another reduces the amount of color information in the image. The number of frames being transmitted can also be reduced. Some prior art image compression standards use a combination of these and other techniques.

The number of images transmitted in an image stream can be such that the transmitter only periodically sends images, e.g., every twelfth actual image. The receiver reconstructs an approximation of the missing intervening images using predicted images and interpolation, or bi-directional images. The predicted images are typically based on a form of motion compensation derived from an analysis of the movement of objects in the actual images. A typical image sequence might be IBBBPBBBPBBBI, where "I" represents an actual transmitted image, "P" represents a predicted image, and "B" represents an interpolated bi-directional image. But undesirable artifacts are created by this process and can produce jagged lines and blurry motion.

A transmitting computer can send instructions for reconstructing a scene to a receiving computer. For example, where the transmitted image stream is a three-dimensional moving picture scene, such as a virtual reality model of a building or a scene from a computer game. For a simple scene, such instructions can need substantially less transmission bandwidth than that required by the rendered images. More complex scenes may be such that the instructions require more bandwidth than transmitting the images. Client computers rarely have sufficient processing power to render complex moving scenes in real time, so this option is difficult to take advantage of.

Images of three-dimensional scenes can be rendered using a commercial graphics application program interface (API), e.g., OpenGL or DirectX. When an image is rendered, each pixel in the image has a depth value, a "Z-value", and one or more color values. Such format is typical of most hardware three-dimensional graphics accelerators.

SUMMARY OF THE PRESENT INVENTION

Briefly, a method embodiment of the present invention transmits three-dimensional scene image sequences from a server to a client computer. Each image includes an array of pixels. Each pixel has an associated depth value within the three-dimensional scene. Each current-image has a previous-image. A previous-image mesh of coordinates and depth values for selected pixels from the array of pixels in the previous-image is generated at the server and the depth values are transmitted to the client.

A change-in-view matrix representing change in viewing parameters between the previous-image and the current-image is generated at the server and transmitted to the client. Independently at both the server and at the client, the change-in-view matrix is applied to the previous-image mesh to create a current-image mesh, that is applied to the previous-image to generate a predicted current-image. The current-image is generated at the server and a difference between the current-image and the predicted current-image is computed. The computed difference is transmitted to the client and applied to the predicted current-image generated at the client to generate the current-image.

DETAILED DESCRIPTION OF THE EMBODIMENTS

Figure 1:
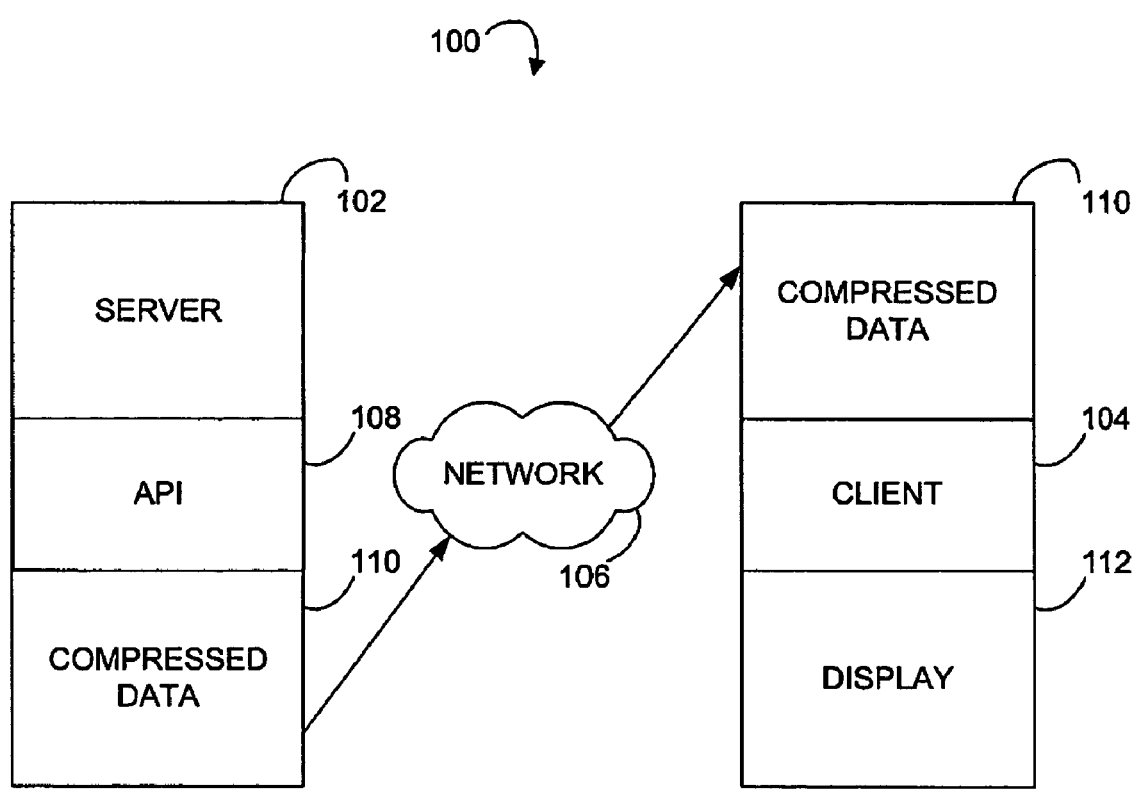
FIG. 1 is a block diagram illustrating the creation and transmission of compressed data from a server across a communications network to a client with a display.

FIG. 1 represents a system embodiment of the present invention, and is referred to herein by the general reference numeral 100. The system 100 includes a server computer 102 connected to a client computer 104 by network 106. A graphics-rendering application hosted on server computer 102 displays motion image sequences on client computer 104 without the application itself being installed on the client computer. The client has limited graphics rendering capability, and network bandwidth limitation preclude transmission of a full geometric model to the client.

Server 102 uses a graphics application programming interface (API) 108, to render each image in the sequence. Acceptable API's are commercially marketed as OpenGL or DirectX. Server 102 then computes a compressed set of data 110, consisting of instructions for generating a next image in the sequence from a previous-image. Compressed data 110 is transmitted over network 106 to client 104, that then computes the actual next image and displays it on display 112.

Figure 2:
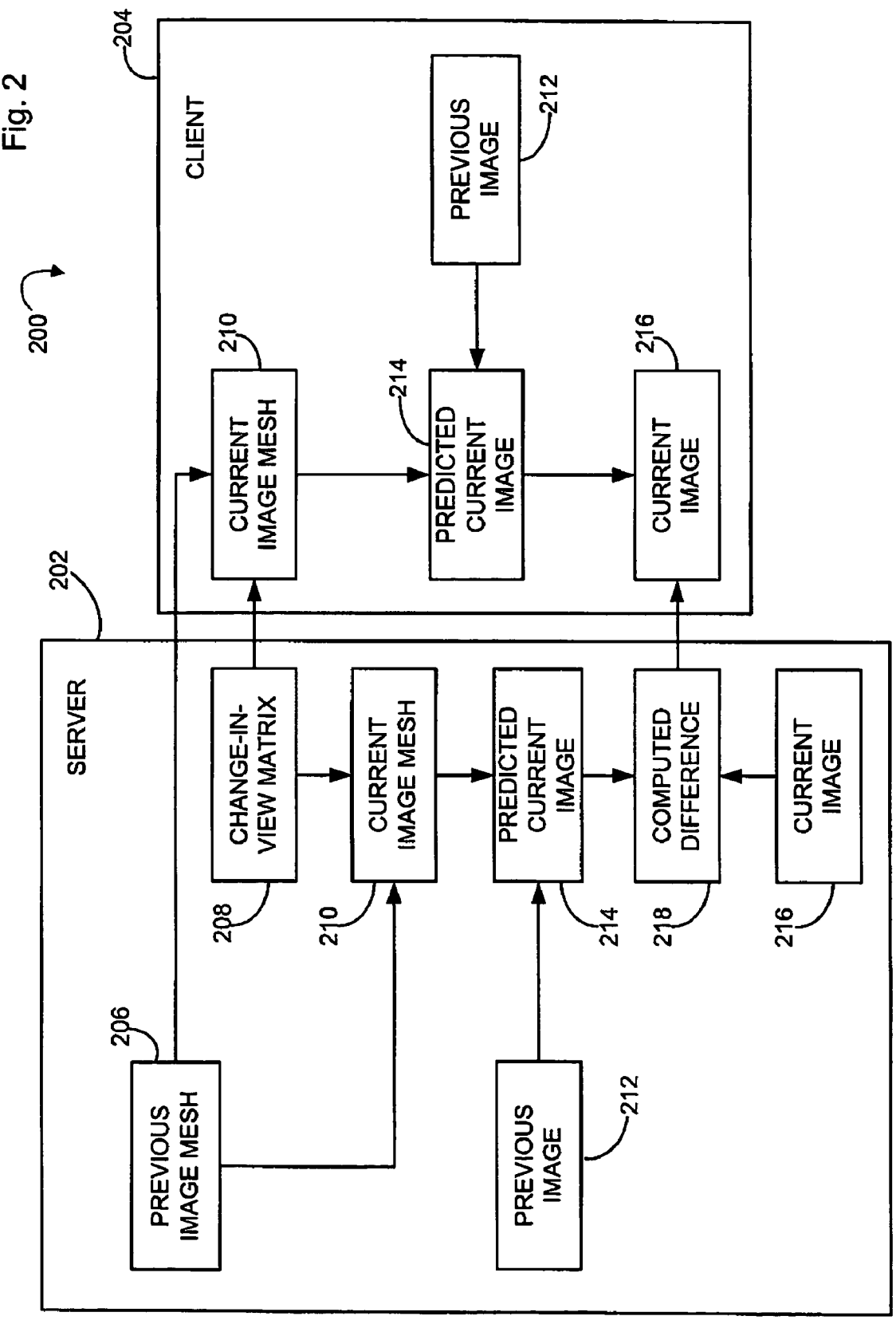
FIG. 2 is a function block diagram of a system embodiment of the present invention.

FIG. 2 is another system embodiment of the present invention, and is referred to herein by the general reference numeral 200. In system 200, a sequence of two-dimensional images of a three-dimensional scene is transmitted from a server 202 to a client 204. For example, these are transmitted over the Internet or other computer data network.

Each image in a sequence includes an array of pixels. Each pixel in the array has color values and a depth (z) value. Such "z-value" represents a depth in the three-dimensional scene. Each pixel has "x" and "y" coordinate values determined by the pixel's position in the pixel array. The color components of a pixel may be described, e.g., by red-green-blue (RGB), hue-saturation-brightness (HSB), luminance-chrominance-saturation (YUV), or other suitable method, including luminance only (monochrome).

Each current-image has an immediately preceding previous-image. Server 202 generates a previous-image mesh 206 consisting of coordinates and depth values for selected pixels from a previous-image array of pixels. Previous-image mesh 206 depth values are transmitted to client 204. The pixels included in the mesh are regularly spaced throughout the pixel array, and such mesh spans the entire image. The mesh can be a sparse rectangular grid generated by sub-sampling of the image data.

For example, the pixel array can be divided into adjoining pixel squares of 15-by-15. The corner pixels in each square can be selected for inclusion in the mesh. The points of the mesh are three-dimensional points. Such form a continuous triangle mesh that approximates the surface formed by the depth values of the pixels in the image. Only the depth (z) values of the mesh pixels need to be transmitted to the client because the client has previously received the x and y values. Such are the same for every previous-image mesh.

Server 202 also generates change-in-view matrix 208 that represents a change in the viewing parameters that are used by server 202 to render the current-image in the image sequences, when compared with the viewing parameters that were used to render the previous-image. The viewing parameters comprise a three-dimensional homogeneous viewing transformation matrix.

Change-in-view matrix 208 is transmitted over the computer network to client 204. Changes in viewing parameters may be initiated by a user at the client computer requesting a zoom, pan or other such movement. Changes may also be initiated by the server. Such server may have a pre-programmed viewing parameter sequence.

Server 202 applies change-in-view matrix 208 to previous-image mesh 206 to create current-image mesh 210. The client 204 performs the same procedure to create a duplicate current image mesh 210. The previous-image mesh 206 typically has pixels that are evenly distributed across the x and y pixel plane coordinates. Applying the change-in-view matrix to the previous-image mesh results in movement in the x and y values as well as the associated depth z values of individual pixels. Therefore, the current-image mesh embodies a "warp". The current-image mesh 210 is applied to previous-image 212 to generate a predicted current-image 214. A perspective-correct warp can be used that takes into account a perspective projection of a current view matrix. Such warping step is also performed by client 204, resulting in an identical ye independently created predicted current-image 214 at the client 204.

Server 202 generates an actual current-image 216 using a graphics API, and computes a difference 218 between current-image 216 and predicted current-image 214. Such computed difference 218 is then compressed and transmitted to client 204 over the network. Client 204 generates its current-image 216 by applying the received computed difference 218 to predicted current-image 214. Current-image 216 can then be displayed locally by client 204.

Figure 3:
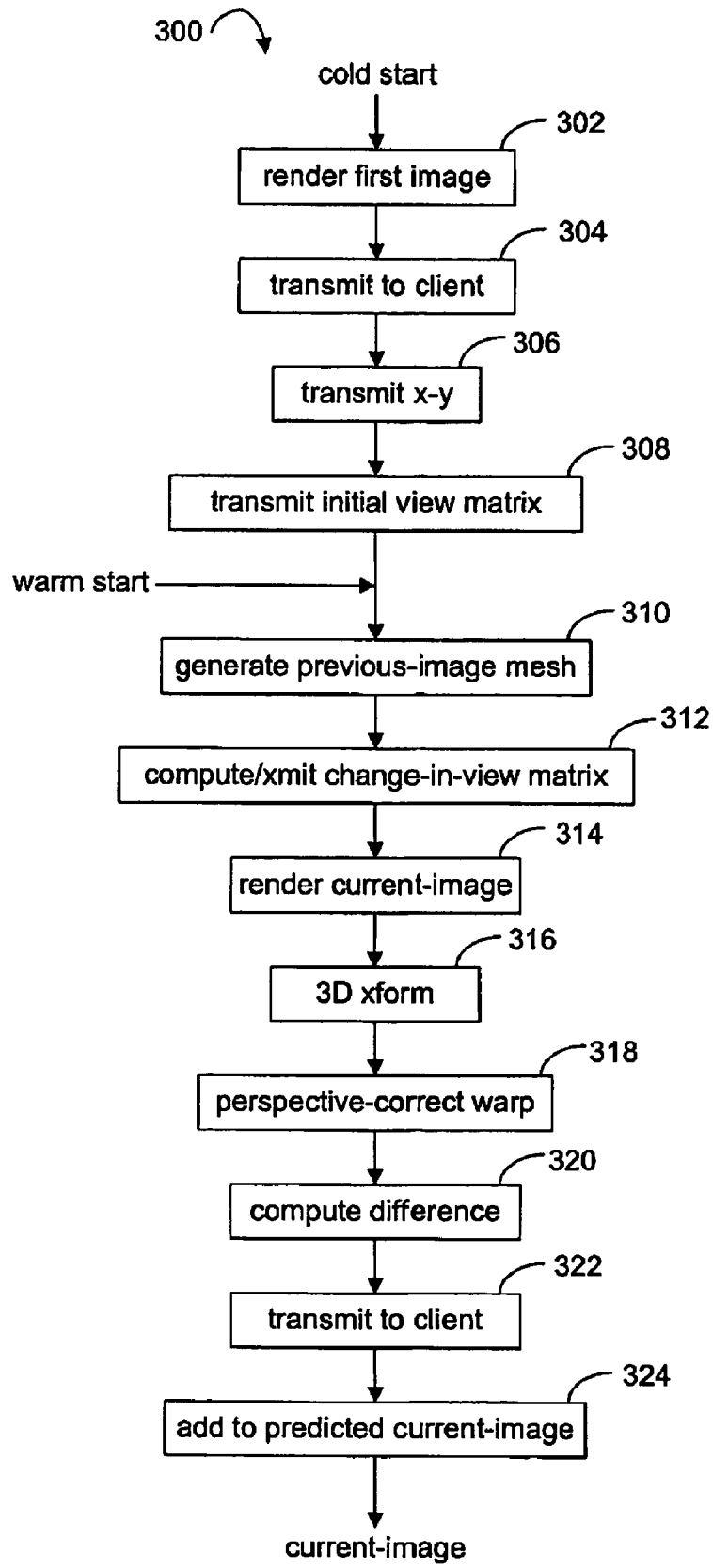
FIG. 3 represents a method embodiment of the present invention.

FIG. 3 represents a method embodiment of the present invention, and is referred to herein by the general reference numeral 300. Method 300 includes an initialization process to start a transmission sequence. In a step 302, the server renders the first image, including depth values associated with each pixel. In a step 304, the server transmits the first image to the client, without the depth values. In a step 306, the server transmits to the client information concerning the x and y coordinates of the pixels that will be used in each "previous-image mesh". In a step 308, the server transmits to the client an initial view matrix.

After initialization, subsequent images are produced by a step 310, in which, the server generates the previous-image mesh, and transmits the depth values of that mesh to the client. In a step 312, the server computes and transmits to the client the change-in-view matrix. In a step 314, the server renders the current-image using the current viewing parameters. In a step 316, the server and the client each apply a three-dimensional transformation to the previous-image mesh to obtain a current-image mesh, the three-dimensional transformation being the change-in-view matrix. In a step 318, the server and the client each apply a perspective-correct warp to the previous-image using the current-image mesh to obtain a predicted current-image. In a step 320, the server computes the pixel-by-pixel difference between the current-image and the predicted current-image. In a step 322, the computed difference is transmitted to the client. In a step 324, the client adds the computed difference to the predicted current-image to obtain the current-image, which is displayed on the client.

A lossless still-image compression method may be used for the first image and the differences transmitted from the server. This is highly suitable for technical graphics applications. Artifacts such as jagged lines and blurry motion created by many current lossy image and image stream compression methods can be avoided entirely. Alternatively, embodiments of the present invention can be used in conjunction with conventional compression techniques for the computed difference 218. These techniques could involve the use of lossy image compression possibly in conjunction with predicted and interpolated frames.

Figure 4:
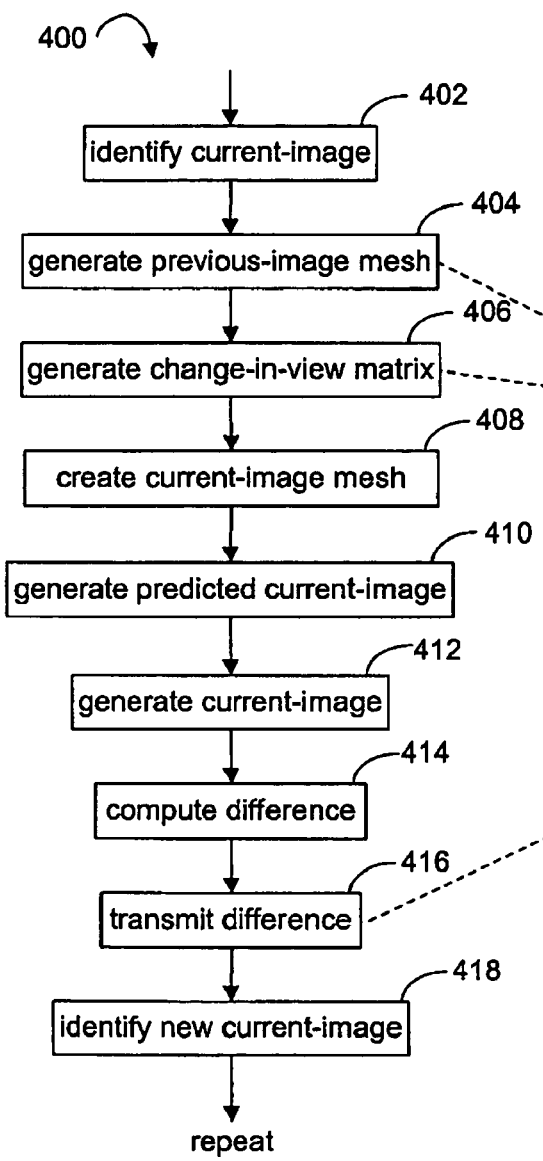
FIG. 4 represents a computer software embodiment of the present invention.

Referring now to FIG. 4, another embodiment of the present invention comprises a computer software program 400. An instruction 402 identifies a current-image and a previous-image, each image being comprised of an array of pixels, each pixel having an associated depth value in the three-dimensional scene. An instruction 404 generates a previous-image mesh of coordinates and depth values for selected pixels from the array of pixels in the previous-image and transmits to a client the depth values. An instruction 406 generates and transmits to the client a change-in-view matrix representing a change in viewing parameters between the previous-image and the current-image. An instruction 408 applies the change-in-view matrix to the previous-image mesh to create a current-image mesh. An instruction 410 applies the current-image mesh to the previous-image to generate a predicted current-image. An instruction 412 generates the current-image. An instruction 414 computes a difference between the current-image and the predicted current-image. An instruction 416 transmits the computed difference to the client. An instruction 418 identifies a new current-image and repeats.

Figure 5:
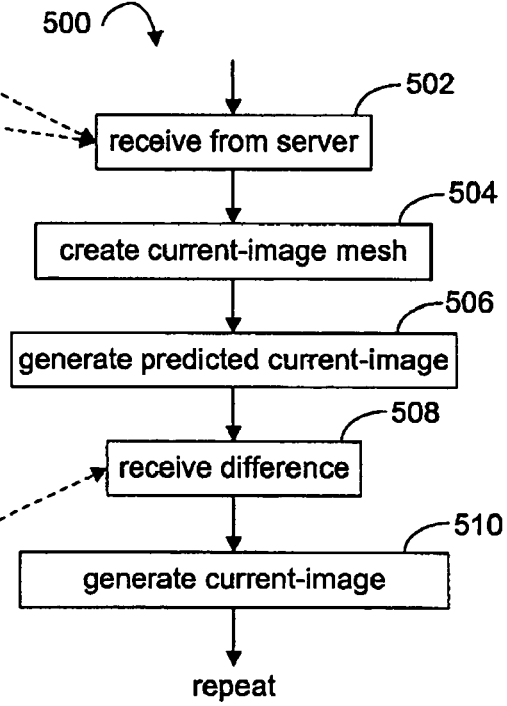
FIG. 5 represents an alternate computer software embodiment of the present invention.

Referring now to FIG. 5, another embodiment of the present invention includes a computer software program 500. An instruction 502 receives from the server the previous-image mesh depth values, and the change-in-view matrix. An instruction 504 applies the change-in-view matrix to the previous-image mesh to create a current-image mesh. An instruction 506 applies the current-image mesh to the previous-image to generate a predicted current-image. An instruction 508 receives from the server the computed difference. An instruction 510 applies the computed difference to the predicted current-image to generate the current-image.

While some embodiments of the present invention have been illustrated here in detail, it should be apparent that modifications and adaptations to these embodiments may occur to one skilled in the art without departing from the scope of the present invention as set forth in the following claims.

The invention claimed is:

1. A video image compression method, comprising:
generating at a server a previous-image mesh of coordinates and depth values for selected pixels from an array of pixels in a previous-image;
transmitting said depth values to a client;
generating at said server and transmitting to said client a change-in-view matrix representing a change in viewing parameters between said previous-image and a current-image;
independently applying at said server, and at said client, said change-in-view matrix to said previous-image mesh to create a current-image mesh, and applying said current-image mesh to said previous-image to generate a predicted current-image;
at said server, generating said current-image and computing a difference between said current-image and said predicted current-image; and
transmitting said computed difference to said client and applying said computed difference to said predicted current-image at said client to generate said current-image.

2. The method of claim 1, wherein:
the steps are such that three-dimensional scene image sequences are transmitted from a server to a client computer, and each image includes an array of pixels, and each pixel has an associated depth value in said three-dimensional scene.

3. The method of claim 1 further comprising:
initializing the transmission by generating at the server and transmitting to the client a first image in the sequence;
transmitting from the server to the client the coordinates of points that comprise the previous-image mesh; and
generating at the server and transmitting to the client a set of initial viewing parameters.

4. The method of claim 1 wherein:
the computed difference is a pixel-by-pixel signed difference.

5. The method of claim 1 wherein:
the previous-image mesh is a rectangular array of regularly spaced three-dimensional points, each having x and y coordinate values determined by the positioning of a corresponding pixel in the pixel image plane, with a z value being the depth value associated with the corresponding pixel.

6. The method of claim 1 wherein:
the client computer displays the image sequences without displaying any interpolated or predicted images.

7. A computer-readable medium having stored thereon a computer program for transmitting a three-dimensional scene image sequences to a client computer, the computer program comprising instructions for:
identifying a current-image and a previous-image, each image being comprised of an array of pixels, each pixel having an associated depth value in the three dimensional scene;
generating a previous-image mesh of coordinates and depth values for selected pixels from the array of pixels in the previous-image and transmitting to a client the depth values;
generating and transmitting to a client a change-in-view matrix representing a change in viewing parameters between the previous-image and the current-image;
applying the change-in-view matrix to the previous-image mesh to create a current-image mesh, and applying the current-image mesh to the previous-image to generate a predicted current-image;
generating the current-image and computing a difference between the current-image and the predicted current-image;
transmitting the computed difference to the client; and
identifying a new current-image and repeating the steps.

8. The computer readable medium of claim 7 further comprising instructions for:
generating at the server and transmitting to the client a first image in the sequence;
transmitting from the server to the client the coordinates of points that comprise the previous-image mesh; and
generating at the server and transmitting to the client a set of initial viewing parameters.

9. The computer readable medium of claim 7 wherein the instructions for generating the previous-image mesh are instructions for calculating a rectangular array of regularly spaced three-dimensional points, each having x and y coordinate values determined by the positioning of a corresponding pixel in the pixel image plane with a z value being the depth value associated with the corresponding pixel.

10. The computer readable medium of claim 7 wherein the computer program transmits instructions for a continuous stream of images, so that the client computer displays the image sequences without displaying any interpolated or predicted images.

11. A system for transmitting three-dimensional scene image sequences, the system comprising a server and a client computer, the server having programmed thereon computer software that comprises instructions for:
identifying a current-image and a previous-image, each image being comprised of an array of pixels, each pixel having an associated depth value in the three dimensional scene;
generating a previous-image mesh of coordinates and depth values for selected pixels from the array of pixels in the previous-image and transmitting to a client the depth values;
generating and transmitting to the client a change-in-view matrix representing a change in viewing parameters between the previous-image and the current-image;
applying the change-in-view matrix to the previous-image mesh to create a current-image mesh, and applying the current-image mesh to the previous-image to generate a predicted current-image;
generating the current-image and computing a difference between the current-image and the predicted current-image;
transmitting the computed difference to the client; and
identifying a new current-image and repeating the above steps;
the client having programmed thereon computer software comprising instructions for:
receiving from the server the previous-image mesh depth values, and the change-in-view matrix;
applying the change-in-view matrix to the previous-image mesh to create a current-image mesh;
applying the current-image mesh to the previous-image to generate a predicted current-image; and
applying the computed difference to the predicted current-image to generate the current image.

* * * * *

UNITED STATES PATENT AND TRADEMARK OFFICE
CERTIFICATE OF CORRECTION

PATENT NO. : 7,529,418 B2 Page 1 of 1
APPLICATION NO. : 10/850887
DATED : May 5, 2009
INVENTOR(S) : Michael E. Goss It is certified that error appears in the above-identified patent and that said Letters Patent is hereby corrected as shown below:

In column 6, line 63, in Claim 11, insert -- receiving from the server the computed difference and -- before "applying".

In column 6, line 64, in Claim 11, delete "current image." and insert -- current-image. --, therefor.

Signed and Sealed this

Twenty-fourth Day of November, 2009

David J. Kappos
*Director of the United States Patent and Trademark Office*